US011412905B2

(12) United States Patent
Christensen

(10) Patent No.: US 11,412,905 B2
(45) Date of Patent: Aug. 16, 2022

(54) RETRACTABLE VACUUM HOSE SYSTEM

(71) Applicant: Layne Christensen, Eden, UT (US)

(72) Inventor: Layne Christensen, Eden, UT (US)

( * ) Notice: Subject to any disclaimer, the term of this patent is extended or adjusted under 35 U.S.C. 154(b) by 626 days.

(21) Appl. No.: 16/295,735

(22) Filed: Mar. 7, 2019

(65) Prior Publication Data

US 2019/0274504 A1 Sep. 12, 2019

Related U.S. Application Data

(60) Provisional application No. 62/640,177, filed on Mar. 8, 2018.

(51) Int. Cl.
| | | |
|---|---|---|
| *H01R 9/03* | (2006.01) |
| *A47L 9/24* | (2006.01) |
| *B65H 75/36* | (2006.01) |
| *F16L 3/01* | (2006.01) |
| *F16L 7/00* | (2006.01) |
| *F16L 11/12* | (2006.01) |
| *F16L 11/127* | (2006.01) |
| *F16L 25/01* | (2006.01) |
| *H01R 39/00* | (2006.01) |
| *H01R 39/64* | (2006.01) |
| *A47L 5/38* | (2006.01) |
| *H01R 39/56* | (2006.01) |

(52) U.S. Cl.
CPC ............ *A47L 9/246* (2013.01); *B65H 75/362* (2013.01); *F16L 3/01* (2013.01); *F16L 7/00* (2013.01); *F16L 11/12* (2013.01); *F16L 11/127* (2013.01); *F16L 25/01* (2013.01); *H01R 9/03* (2013.01); *H01R 39/00* (2013.01); *H01R 39/64* (2013.01); *A47L 5/38* (2013.01); *H01R 39/56* (2013.01)

(58) Field of Classification Search
CPC .......... A47L 9/246; B65H 75/362; F16L 3/01; F16L 7/00; F16L 11/12; F16L 11/127; F16L 25/01; H01R 9/03; H01R 39/00; H01R 39/64
See application file for complete search history.

(56) References Cited

U.S. PATENT DOCUMENTS

| | | | |
|---|---|---|---|
| 3,682,500 A | 8/1972 | Hamrick | |
| 5,387,117 A * | 2/1995 | Moyher, Jr. ............ | A47L 9/246 15/314 |
| 5,430,978 A | 7/1995 | Kohler | |
| 7,020,829 B2 | 5/2006 | Harman et al. | |
| 7,653,962 B2 | 2/2010 | Gordon | |

(Continued)

FOREIGN PATENT DOCUMENTS

| | | | | |
|---|---|---|---|---|
| EP | 1314389 A1 * | 5/2003 | ............... | A47L 5/38 |
| WO | WO 02/071910 | 9/2002 | | |

OTHER PUBLICATIONS http://www.hideahose.com/hide-a-hose-central-vacuum-system.aspx (Prior to Mar. 7, 2019).

(Continued)

*Primary Examiner* — Tho D Ta
(74) *Attorney, Agent, or Firm* — Bateman IP; Randall B. Bateman

(57) ABSTRACT

A retractable vacuum hose system may include a hose having a distal end portion and a proximal end portion and a hose engagement terminal for selectively engaging the proximal end portion to secure the proximal end portion and provide power through the hose.

21 Claims, 18 Drawing Sheets

(56) References Cited

U.S. PATENT DOCUMENTS

| | | |
|---|---|---|
| 7,793,384 B1 | 7/2010 | Kerr |
| 9,717,381 B2 | 8/2017 | Harman |
| 9,782,047 B2 | 10/2017 | Nieschwitz et al. |
| 2009/0188073 A1 | 7/2009 | Gabric et al. |
| 2015/0257615 A1 | 9/2015 | Qian |
| 2017/0127897 A1 | 5/2017 | Drivstuen et al. |

OTHER PUBLICATIONS http://www.retraflex.com/en/ (Prior to Mar. 7, 2019).
https://www.youtube.com/watch?v=CWUblxM2M54&t=20s (Apr. 14, 2015).

* cited by examiner

RETRACTABLE VACUUM HOSE SYSTEM

BACKGROUND

State of the Art

The present invention relates to a retractable vacuum cleaning system. More specifically, the present system relates to a central vacuum system which has a retractable hose which provides power there through. The retractable hose may, for example, be capable of remote activation of the vacuum pump and use of powered extensions.

Field of Art

Vacuum cleaners are a ubiquitous part of cleaning a home or building. While portable vacuum cleaners are commonly used, many people do not like the idea that any dust or other material which bypasses the vacuum's filter simply ends up being recirculated into the room being vacuumed. Additionally, many people do not like carrying around the weight of a self-contained vacuum cleaner.

To resolve these concerns, central vacuum systems have been increasingly popular. The central vacuum system usually has the vacuum unit located in a basement or garage and then is vented to outside the building or to some other location where dust passing through the filter creates less of a concern. There is also not the need to carry around the vacuum cleaner as one cleans the building. Rather the hose and wand are all that is needed.

While central vacuum systems are often considered more hygienic, they present an alternate problem of a long hose. Many homes will only have one or two ports on each floor into which the vacuum hose can be attached. In order to reach everywhere in the house, it is often required to have hoses of 30-50 feet long to reach various parts of the house. When a room needs to be vacuumed, the hose and the vacuum wand must be retrieved and then attached at one end to the port in the wall, with the remainder being carried toward the room. Dealing with the hose is often cumbersome and it is not uncommon to see someone open the cupboard or closet where the hose is kept, only to see the hose and wand come tumbling out.

Because of the difficulty of handling long hoses, many attempts have been made to provide retractable hoses which are stored out of the way. Examples of such systems are shown in U.S. Pat. Nos. 9,782,047, 7,793,384, 7,653,962, 7,010,829, and 3,682,500, as well as U.S. Pub. Nos. 2017/0127897, 2015/0257615, and 2009/0188073. Such systems may have various draw backs. For example, some systems require an unusually large hole in the wall or a large container for the hose. Others require the entire hose to be pulled out of the wall prior to use and then require the hose to be reinserted and fed back into place.

An additional problem with many retractable hoses is that they do not provide power for remote activation and termination of the vacuum pump, and for powering the wand, any beater brush, etc. Rather, the hose simply provides a conduit for the suction and is thus less desirable for use in carpeted areas.

Thus, there is a need for a retractable vacuum hose system which is easy to use and versatile. There is also a need for a retractable vacuum hose which can power remote functions.

SUMMARY OF THE INVENTION

The following summary of the present invention is not intended to describe each illustrated embodiment or every possible implementation of the invention, but rather to give illustrative examples of application of principles of the invention.

In some configurations, the invention may comprise a hose retractably mounted in a central vacuum system. The hose may include one or more selectively engageable contacts for providing power through the hose to a handle disposed on the distal end and/or for receiving signals from the handle, such as to turn on or turn off the central vacuum.

In accordance with one aspect of the present disclosure, the handle is detachable from the hose without the need for tools so that the handle and wand can be stored separately from the hose.

In accordance with another aspect of the present disclosure, the hose may engage a rotatable connector so that the hose can rotate independent of the handle.

In accordance with one aspect of the present disclosure, the retractable hose can be powered while one end of the hose remains in the central vacuum system.

In accordance with one aspect of the present disclosure, the proximal end of the hose remains within the tubing of the central vacuum system and may be engaged in more than one location to control the length of hose extending from the wall while still providing power to the hose.

In accordance with one aspect of the present disclosure, a hose engagement terminal includes a retractable contact engagement system for selectively engaging the proximal end of the retractable vacuum hose.

In accordance with another aspect of the present disclosure, the hose engagement terminal may include a control system to selectively hold the proximal end of the hose.

In accordance with yet another aspect of the present disclosure, the hose engagement terminal may be configured to selectively engage the contacts adjacent the proximal end of the hose to thereby selectively provide power through the hose.

In accordance with yet another aspect of the present disclosure, a control panel or switch may be provided which can be used to selectively turn on power to the vacuum system, to allow partial or complete extension of the hose, and/or to selectively provide power through the hose.

These and other aspects of the present invention are realized in a retractable vacuum hose system as shown and described in the following figures and related description. It will be appreciated that various embodiments of the invention may not include each aspect set forth above and aspects discussed above shall not be read into the claims unless specifically described therein.

BRIEF DESCRIPTION OF THE DRAWINGS

Various embodiments of the present disclosure are shown and described in reference to the numbered drawings wherein.

Figure 1:
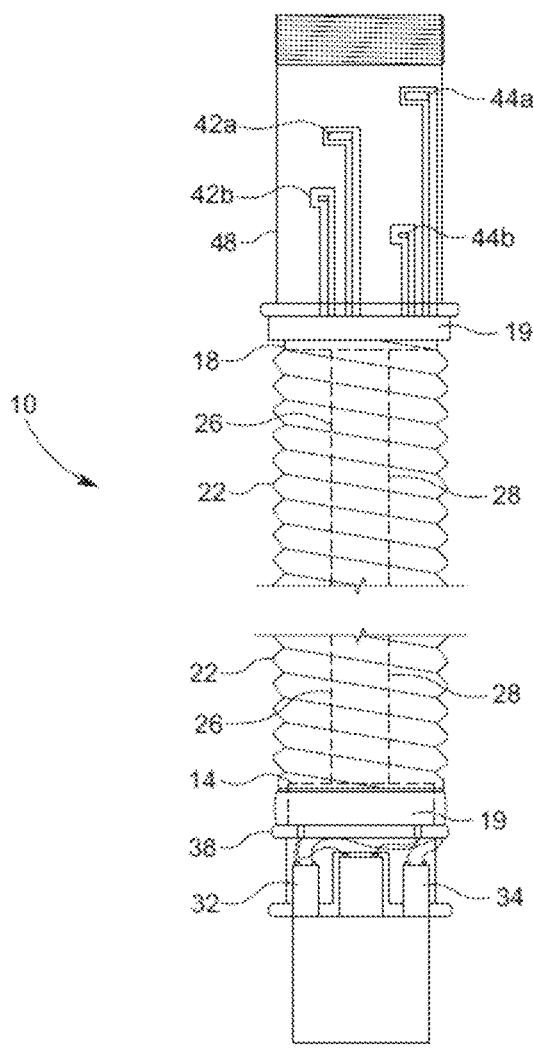
FIG. 1 illustrates a top, fragmented view of a retractable vacuum hose having electrical contacts at either end.

It will be appreciated that the drawings are illustrative and not limiting of the scope of the invention which is defined by the appended claims. The embodiments shown accomplish various aspects and objects of the invention. It will be appreciated that it is not possible to clearly show each element and aspect of the present disclosure in a single figure, and as such, multiple figures are presented to separately illustrate the various details of different aspects of the invention in greater clarity. Similarly, not all configurations or embodiments described herein or covered by the appended claims will include all of the aspects of the present disclosure as discussed above.

DETAILED DESCRIPTION

Various aspects of the invention and accompanying drawings will now be discussed in reference to the numerals provided therein so as to enable one skilled in the art to practice the present invention. The skilled artisan will understand, however, that the methods described below can be practiced without employing these specific details, or that they can be used for purposes other than those described herein. Indeed, they can be modified and can be used in conjunction with products and techniques known to those of skill in the art in light of the present disclosure. The drawings and the descriptions thereof are intended to be exemplary of various aspects of the invention and are not intended to narrow the scope of the appended claims. Furthermore, it will be appreciated that the drawings may show aspects of the invention in isolation and the elements in one figure may be used in conjunction with elements shown in other figures.

Reference in the specification to "one embodiment," "one configuration," "an embodiment," or "a configuration" means that a particular feature, structure, or characteristic described in connection with the embodiment may be included in at least one embodiment, etc. The appearances of the phrase "in one embodiment" in various places may not necessarily limit the inclusion of a particular element of the invention to a single embodiment, rather the element may be included in other or all embodiments discussed herein.

Furthermore, the described features, structures, or characteristics of embodiments of the present disclosure may be combined in any suitable manner in one or more embodiments. In the following description, numerous specific details may be provided, such as examples of products or manufacturing techniques that may be used, to provide a thorough understanding of embodiments of the invention. One skilled in the relevant art will recognize, however, that embodiments discussed in the disclosure may be practiced without one or more of the specific details, or with other methods, components, materials, and so forth. In other instances, well-known structures, materials, or operations may not be shown or described in detail to avoid obscuring aspects of the invention.

Before the present invention is disclosed and described in detail, it should be understood that the present invention is not limited to any particular structures, process steps, or materials discussed or disclosed herein, but is extended to include equivalents thereof as would be recognized by those of ordinary skill in the relevant art. More specifically, the invention is defined by the terms set forth in the claims. It should also be understood that terminology contained herein is used for the purpose of describing particular aspects of the invention only and is not intended to limit the invention to the aspects or embodiments shown unless expressly indicated as such. Likewise, the discussion of any particular aspect of the invention is not to be understood as a requirement that such aspect is required to be present apart from an express inclusion of that aspect in the claims.

It should also be noted that, as used in this specification and the appended claims, singular forms such as "a," "an," and "the" may include the plural unless the context clearly dictates otherwise. Thus, for example, reference to "a bracket" may include an embodiment having one or more of such brackets, and reference to "the target plate" may include reference to one or more of such target plates.

As used herein, the term "substantially" refers to the complete or nearly complete extent or degree of an action, characteristic, property, state, structure, item, or result to function as indicated. For example, an object that is "substantially" enclosed would mean that the object is either completely enclosed or nearly completely enclosed. The exact allowable degree of deviation from absolute completeness may in some cases depend on the specific context, such that enclosing the nearly all of the length of a lumen would be substantially enclosed, even if the distal end of the structure enclosing the lumen had a slit or channel formed along a portion thereof. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

As used herein, the term "generally" refers to something that has characteristics of a quality without being exactly that quality. For example, a structure said to be generally vertical would be more vertical as horizontal, i.e. would extend more than 45 degrees from horizontal. Likewise, something said to be generally circular may be rounded like an oval but need not have a consistent diameter in every direction.

As used herein, the term "about" is used to provide flexibility to a numerical range endpoint by providing that a given value may be "a little above" or "a little below" the endpoint while still accomplishing the function associated with the range.

As used herein, a plurality of items, structural elements, compositional elements, and/or materials may be presented in a common list for convenience. However, these lists should be construed as though each member of the list is individually identified as a separate and unique member.

Concentrations, amounts, proportions and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually. This same principle applies to ranges reciting only one numerical value as a minimum or a maximum. Furthermore, such an interpretation should apply regardless of the breadth of the range or the characteristics being described.

Turning now to FIG. 1, there is a top view of a retractable vacuum hose, generally indicated at 10. The retractable vacuum hose 10 has a distal end portion 14 and a proximal end portion 18. As used herein the distal end portion is used to refer to that end of the vacuum hose which is the furthest from the central vacuum system when the vacuum hose is extended, while the proximal end portion refers to that end which remains closest to or contained in the central vacuum system.

The retractable vacuum hose 10 includes a hose body 22, which may be made from an elongated piece of tubing similar to many conventional vacuum tubes. The hose body 22 may include wiring (represented by dashed lines 26 and 28) which, depending on the tubing may extend generally straight along the wall of the hose body, or may be wrapped in a spiral shape. In one presently preferred embodiment, wiring 26 is a pair of wires configured to carry low voltage power (such as 12V, 24V, etc.), while wiring 28 is a pair of wires configured to carry high voltage power (such as 110*v*). In many central vacuum systems, a high voltage is provided to power a beater brush and light of a vacuum head, while low voltage power is used to turn on and off the central vacuum remotely, such as by a switch on a handle (not shown in FIG. 1) on the distal end of the vacuum hose. It will be appreciated that the hose could have only high voltage power or only low voltage power depending on the cleaning needs at the location and local laws and regulations.

The wiring 26 and 28 may be connected to outlets 32 and 34 on an end piece 38 at the distal end portion of the vacuum hose body 22. The wiring may also ige connect to electrical contacts 42*a*, 42*b*, 44*a* and 44*b* on an end piece 48 attached to the proximal end 18 of the vacuum hose body 22. Thus, electric energy and signals may be sent between opposing ends of the retractable vacuum hose 10.

The end piece 48 at the proximal end portion 18 of the hose body 22 may be attached by a crimp ring 19 or other type of fastener. Likewise, the end piece 38 at the distal end 14 of the hose body 22 may be fastened by crimp rings 19 or other fastener.

Figure 2:
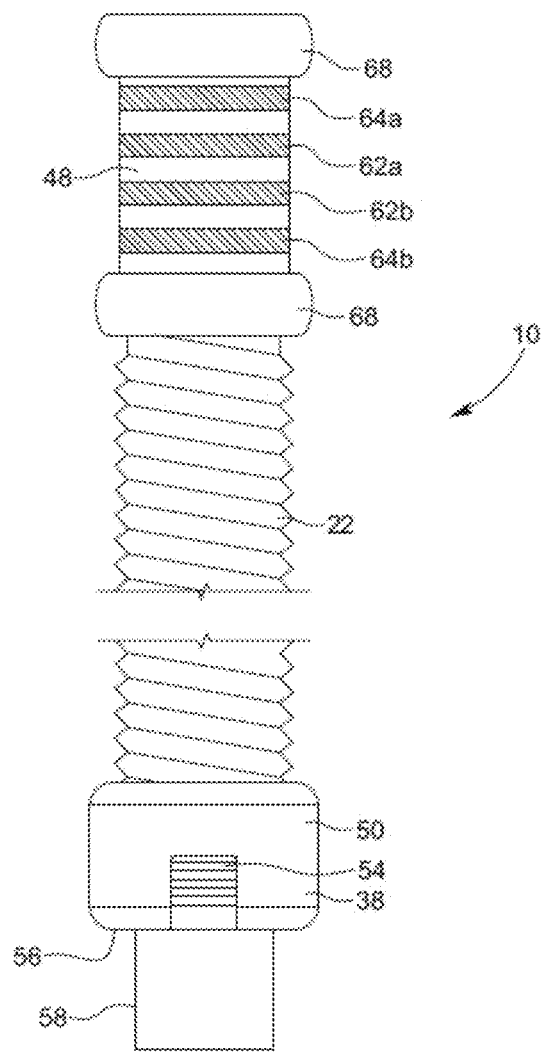
FIG. 2 shows a top, fragmented view similar to that of FIG. 1, but with an end portion at a proximal end for engaging the hose engagement terminal and an end portion at the distal end for engaging the handle of a vacuum wand.

Turning now to FIG. 2, there is shown a top, fragmented view of the retractable vacuum hose 10 with the end pieces 38 and 48 in a final, completed form. The distal end piece 38 has a cover 50 which protects the outlets 32 and 34 and may be configured for engaging a handle (not show) of a vacuum wand.

Figure 3:
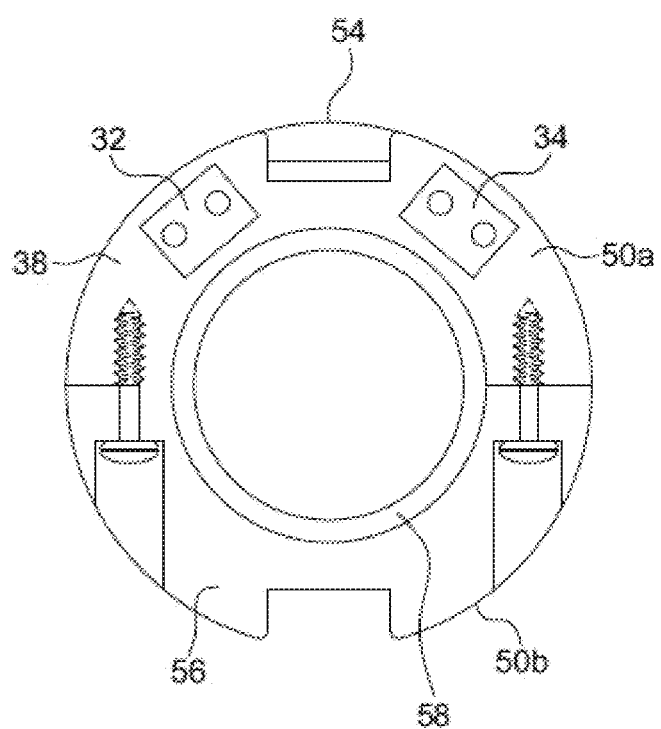
FIG. 3 shows an end view of the distal end piece of FIG. 2, thereby showing a low power electrical outlet and a high power electrical outlet.

Turning momentarily to FIG. 3, there is shown an end view of the end piece 38, thereby showing that the cover 50 may be made of two parts 50*a* and 50*b* which are screwed, snapped or otherwise affixed together. The outlets 32 and 34 are also shown for providing high voltage and low voltage power. A switch 54 may also be included. Alternatively, the switch 54 could be used to turn on or off the central vacuum system without needing the handle to be attached. Thus, for example, the vacuum system could be turned on or off from the distal end portion of the vacuum hose 22 when the distal end portion is being used without a wand or with a brush, etc., such as is common when cleaning a car, blinds or other surfaces other than carpet or other flooring.

To accommodate the attachment of a handle, the distal end piece 38 may form an annular flange 56 with a tube 58 extending therefrom to engage the interior of the handle.

Returning to FIG. 2, at the proximal end piece 48, the electrical contacts 42*a*, 42*b*, 44*a* and 44*b* may be disposed in connection with or attached to include annular electrical contact rings 62*a*, 62*b*, 64*a* and 64*b* to allow the central vacuum system to maintain electrical communication with the proximal end of the hose while allowing the hose to rotate. The annular electrical contact rings 62*a*, 62*b*, 64*a* and 64*b* may be simply spaced apart, or they may have non-conductive spacers disposed therebetween to prevent cross-flow of electricity between them.

The proximal end piece 48 may also include bearings 68 at either end thereof. The bearings 68 may be rounded and configured to slide within the tubing of the central vacuum system. In one current embodiment, the outer diameter of the tubing of a central vacuum system is 2 inches and the outer diameter of the retractable hose 10 is approximately 1.7 inches. The bearings 68 have an outer diameter between about 1.8 and 1.9 inches (preferably within a few hundredths or even a few thousandths of an inch of the inner diameter of the tubing of the central vacuum system) to thereby allow just enough room for them to slide and follow bends in the tubing, but limiting the amount of air that can pass between the bearings and the inner wall of the central vacuum system. Between the bearings 68, the end piece 48 narrows to allow anchoring of the end piece as will be discussed below.

Figure 4:
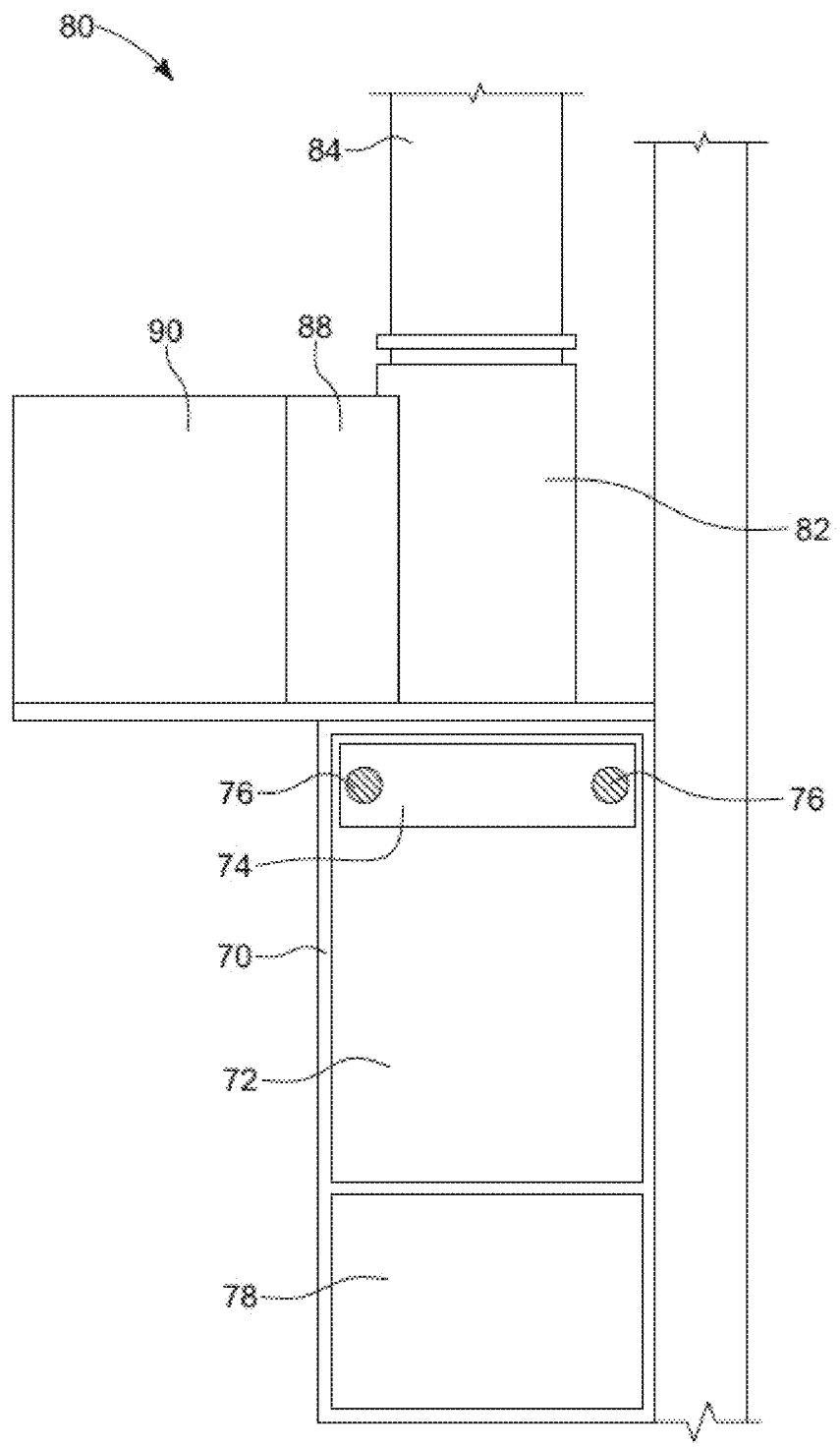
FIG. 4 shows a front view of a port through which the retractable vacuum hose is withdrawn and a vacuum hose engagement terminal which engages the proximal end of the retractable hose to thereby provide power through the retractable vacuum hose.

Turning now to FIG. 4, there is shown a front view of a port 70 through which the retractable vacuum hose is extended and withdrawn. The port 70 includes a void 72 which ordinarily holds the distal end piece 38 of the retractable hose 10 shown in FIG. 2 when the hose is not in use.

Near the top of the void 72 is a housing 74 which holds a stop 75 (FIG. 5) which limits the ability of the proximal end piece 48 of the retractable hose 22 from being pulled out of the wall. (It will be appreciated that the housing 74 may be formed integrally with the stop 75, or may simply anchor or hold the stop).

As will be shown below, the stop may be a structure having a cylindrical tube which nests in the hose engagement terminal and has an inner diameter which is smaller than the outer diameter of the bearing 68 so that the lower bearing 68 cannot be pulled beyond the stop. The stop may also have a flange which engages the housing 74 to hold the stop in place. If the housing 74 is opened so that the stop can be removed, the proximal end piece 48 of the retractable hose 10 can be withdraw, thereby allowing the hose to be replaced if it has become damaged, etc. Opening the housing 74 may be as simple as unscrewing a pair of screws 76 and removing a portion of the housing and the stop 75 (FIG. 5) which is held in the housing 74 by its flange 75a.

Disposed below the void 72 may be a second void 78 which can be used to receive a power supply and an inverter so as to allow the system to provide high voltage power (e.g. 110v in the U.S.) and low voltage power (typically 12 v or 24 v, though other voltages could be used).

Adjacent the port 70 is the hose engagement terminal, generally indicated at 80. The hose engagement terminal includes a receiving chamber 82 which is sized to receive the proximal end piece 48 of the retractable hose 10. To this end, tubing 84 from the central vacuum system attaches to the chamber 82.

The hose engagement terminal 80 may further include an engagement module 88 which may selectively move some portion thereof into the receiving chamber 82 to engage the proximal end piece 48 of the retractable hose 10. (The engagement module 88 may be formed from a single structure or may include multiple parts). The engagement module 88 may anchor the proximal end piece 48 in place, and/or may engage the contact rings 62a, 62b, 64a, 64b to provide power to the retractable hose 10. Movement of the engagement module may be controlled by an actuation module 90. Disposed along the side of the port 70 is a stud, such as is common in a wood framed house. The port may be attached to the stud by screws, or it may be anchored along wallboard by engagement wings or the like. It will also be appreciated that the port could be mounted in masonry block, or even embedded in concrete.

Figure 5:
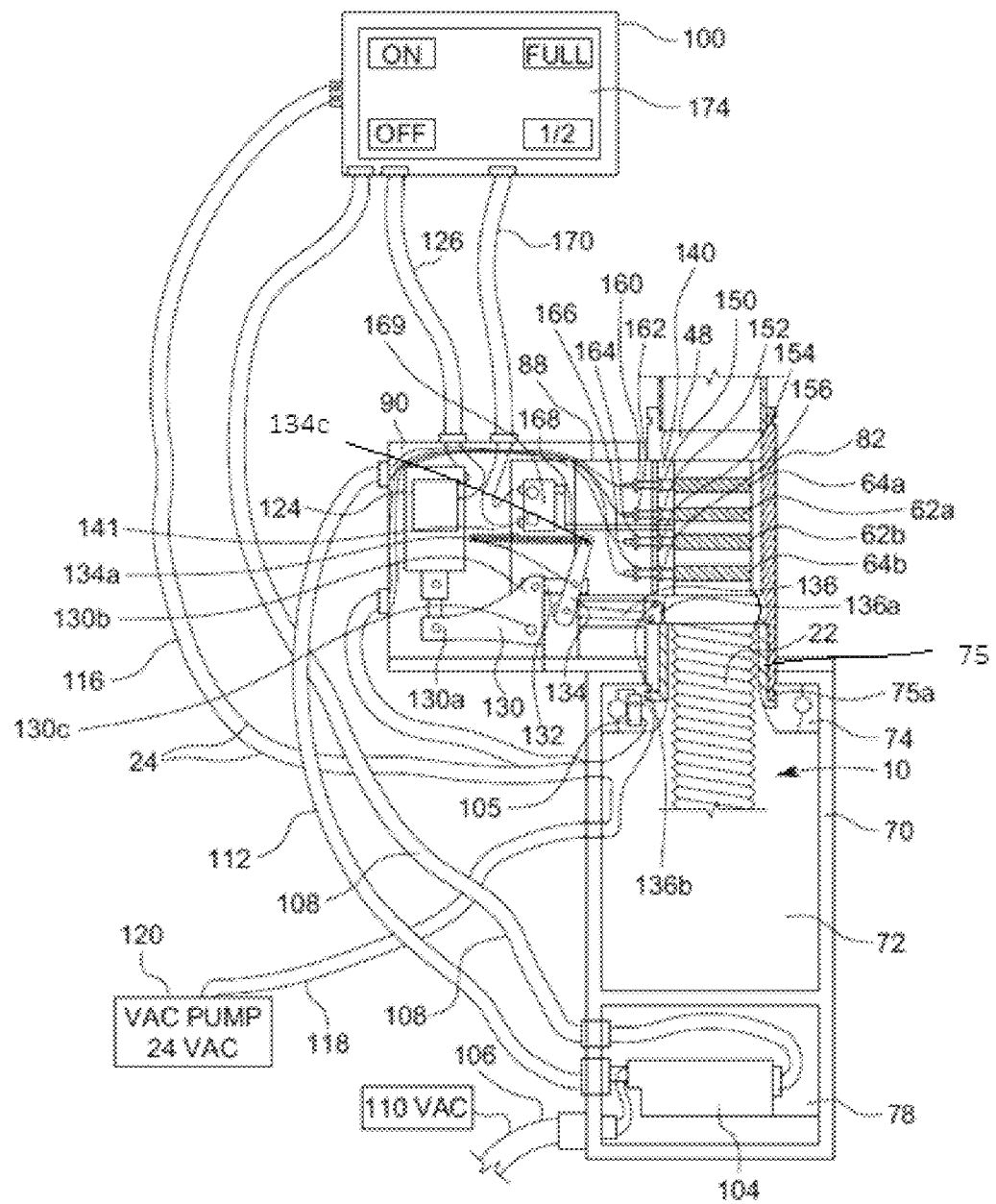
FIG. 5 shows a control box, power supply and cutaway view of the port and the hose engagement terminal and the various components which engage the retractable vacuum hose and provide power thereto.

FIG. 5 shows a cutaway view of the port 70 and hose engagement terminal 80, along with a control system 100 for the retractable hose 10. As was mentioned previously, the lower void 78 in the port 70 may include a power supply 104. The power supply 104 may be attached to a power supply line (such as 110v) and may provide low voltage power (such as 12 volts, direct current) as demonstrated by lines 108 which may extend from the inverter to the control system 100. High voltage lines 112 can also extend from the power supply and provide power to the actuation module 90 and engagement module 88 to provide 110 v power to some of the contact rings 64a, 64b on the proximal end piece 48 of the retractable hose 10. The control system 100 can also send a different low volt power (such as 24v) via lines 116 which are connected by lines 118 to the vacuum pump 120. Thus, the control system 100 can turn the vacuum pump 120 on and off. A door switch 105 may also be disposed in the port to automatically stop the vacuum pump when the door (not shown) on the port is closed.

The control system 100 may be disposed in communication with an actuation module 90, which may include an actuator 124, such as, for example, a solenoid, via a pair of lines 126. Actuation of the actuator 124 may move a plurality of linkages 130, 132, 134 which engage a plunger 136. When the actuator 124 is disposed in a one position, as shown in FIG. 5, it may hold the first linkage in a position wherein one end 130a is up, and the upper end 130b is extended in a position toward the receiving chamber 82. This position of end 130b keeps linkages 132 and 134 in positions toward the receiving chamber 82 and encourages a plunger 136 toward the receiving chamber, such that a head of the plunger 136a is disposed at least partially in the receiving chamber is moved a short distance into the receiving chamber 82.

As the retractable hose 10 is advanced, the bearing 68 on the bottom of the proximal end piece 48 may engage the head 136a of the plunger 136 and rotate it downwardly and outwardly away from the receiving chamber 82. This causes the plunger 36 to move away from the receiving chamber 82 and causes the linkage 134 to rotate about its central axis. The upper end of the linkage 134 moves an engagement member 140 of the engagement module 88 toward the proximal end piece 48. This may be done by overcoming the force of a biasing element 141, such as a spring, which biases the engagement member 140 away from the receiving chamber 82.

One side of the engagement member 140 may be concave and shaped to engage the portion of the proximal end piece 48 between the bearings 68. To accommodate the engagement member 140 sliding into engagement with the proximal end piece 48 as the lower (as shown in the drawing) or more distal bearing 68 engages the plunger head 136a, a small void may be left at the bottom of the engagement member 140. To keep the proximal distal end piece 48 from moving upwardly, a spring loaded pin 143 may extend once the lower bearing has passed, thereby preventing the proximal end piece 48 from moving upwardly.

With the engagement member 140 and pin 143 engaging the proximal end piece 48, the proximal end piece is held in place in the hose engagement terminal 80, thereby preventing the retractable hose 10 from being withdrawn into the central vacuum system. It will be appreciated that the lower bearing 68 cannot move out of the bottom of the receiving chamber 82 because of the stop 75 which is secured by the housing 74. Opening the housing to allow the stop 75 to be removed allows the entire retractable hose 10 to be removed and replaced, etc. The functions for allowing the proximal end piece 48 to be removed from the receiving chamber to facilitate retraction of the hose 10 is discussed in additional detail with respect to FIGS. 9-11.

The engagement member 140 may be formed from a block of plastic or other material. It is preferred in some embodiments that the engagement member be non-conductive, as a plurality of electrical contacts 150, 152, 154 and 156 may be mounted therein. The electrical contacts 150, 152, 154 and 156 are disposed to be in alignment with the electrical contact rings 62a, 62b, 64a and 64b on the proximal end piece 48 of the retractable hose 10, and can move inwardly as the engagement member 140 engages the proximal end piece 48. Such movement causes the electrical contacts 150, 152, 154 and 156 to move into contact with contacts 160, 162, 164 and 166, which are powered. Prior to movement into contact with electrical contacts 160, 162, 164 and 166, however, electrical contacts 150, 152, 154, and 156 may be electrically isolated and therefore not powered until they are moved by contact with the contact rings 62a, 62b, 64a and 64b on the proximal end piece.

The engagement member 140 may also include a slidable pin 168. The slidable pin 168 may engage a pressure switch 169, thereby confirming via feedback lines 170 to the control system 100, that the proximal end piece 48 of the retractable hose 10 is disposed in the receiving channel 82 and that the engagement member 140 is extended into contact with the proximal end piece.

When the user is done, he or she need only press the display panel 174 of the control system 100. The control system 100 may cause the actuator 124 to extend and will ultimately withdraw the engagement member 140 from engagement with the proximal end piece 48. By placing ones hand over the distal end piece 38 (not shown in FIG. 5) or by using a control valve thereon if so provided, a vacuum is maintained upstream from the retractable hose 10 and the hose may be gradually pulled back into the tubing 84 of the central vacuum system by the systems suction.

Those familiar with central vacuum systems will appreciate that dealing with a large length of hose can be the most frustrating aspect of their use. While 50 feet of hose is nice if you are cleaning a large area, the excess hose often gets in the way and must be moved repeatedly while vacuuming.

Figure 6:
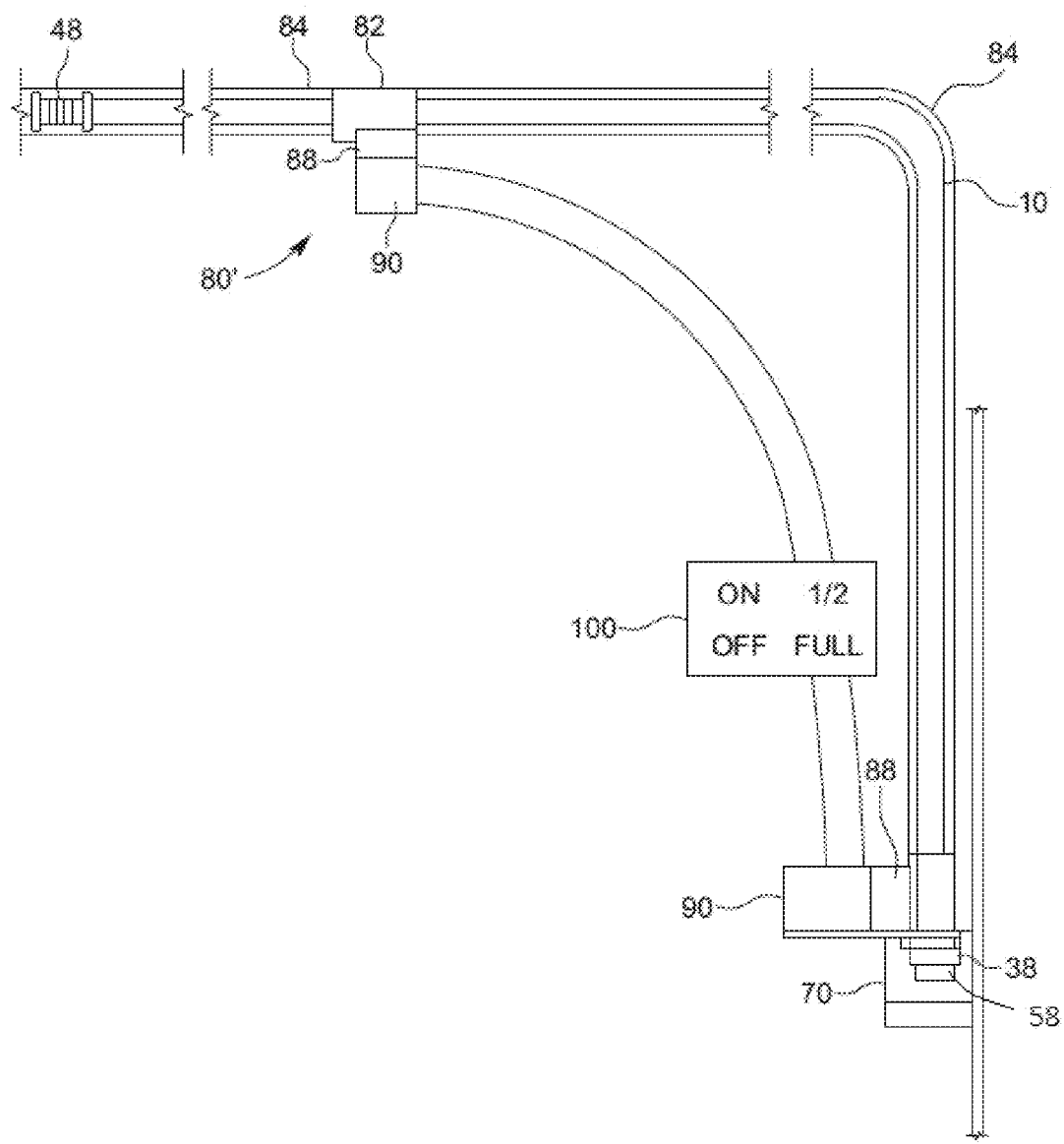
FIG. 6 shows a plan view of a retractable vacuum hose and a central vacuum system having multiple hose engagement terminals.

Turning now to FIG. 6 is shown a plan view of a portion of a central vacuum system having multiple hose engagement terminals. Specifically, the central vacuum system includes tubing 84 which is used to provide suction and carry away dust, dirt, etc. The retractable hose 10 is disposed in a fully retracted position so that the proximal end piece 48 is disposed as far as possible in the tubing 84, and the distal end piece 38 is disposed in the port 70. While a hose engagement terminal 80 is disposed adjacent the port 70 to engage the proximal end piece 48, a second hose engagement terminal 80' is disposed substantially up stream along the tubing 84. The second hose engagement terminal 80' is configured to selectively engage the proximal end piece 48. For example, if the retractable hose 10 is 50 feet long, the second hose engagement terminal 80' may be disposed approximately 25 feet upstream from the port 70 along the tubing. If the user only needs to vacuum an area near the port 70, the user can access the input screen 174 of the control system 100 and indicate that only half the hose is needed. The control system 100 will then activate the second hose engagement terminal 80' so that it will engage and secure the proximal end piece 48, thereby allowing only half of the retractable hose 10 to extend from the port.

Alternatively, a user could pull out the entire length of the retractable hose 10 and clean the furthest areas of the house or building. Once the user has worked his or her way back toward the port 70, the user could activate the control system 100 so that engagement module 88 disengages the proximal end piece 48 and allows the hose to be drawn back into the tubing 84 by the suction of the vacuum pump. Once the control system 100 determines that the proximal end piece 48 has passed the second hose engagement terminal 80', it could activate the second hose engagement terminal and send a signal indicating that the hose may be locked in the half-retracted position by pulling the hose back out of the port so the second hose engagement terminal engages and holds the proximal end piece.

While FIG. 6 shows two hose engagement terminals, it will be appreciated that multiple hose engagement terminals could be used. For example, a very large home or building could have three or four hose engagement terminals for use with a hose which is 60 or 80 feet long, thereby minimizing interference caused by the hose while still allowing maximum reach.

Figure 7:
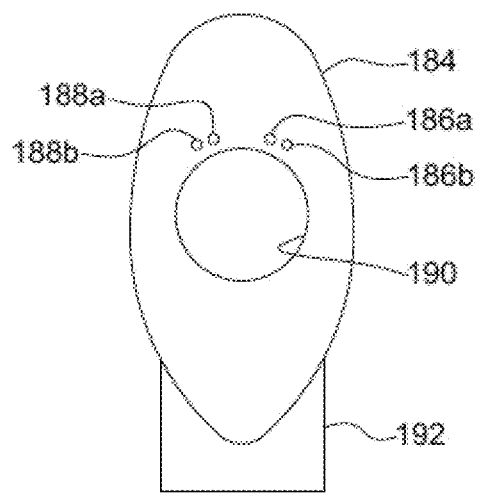
FIG. 7 shows an end view of a handle configured to engage the distal end of the vacuum hose to provide power to the vacuum head and to selectively control the central vacuum system.

Referring now to FIG. 7, there is shown an end view of a handle configured to engage the distal end piece 38 (FIGS. 2 and 3) of the vacuum hose 10 (FIG. 2) to provide power to the vacuum head and to selectively control the central vacuum system. The handle 184 may include a plurality of prongs or contacts 186a, 186b, 188a, and 188b which extend from the handle and nest in the outlets 32 and 34 in the distal end piece 38 shown in FIG. 3. The interaction between the contacts 186a, 186b, 188a and 188b enable the handle and items attached thereto to be powered with low voltage and high voltage electricity.

The handle 184 also includes a channel 190 which receives the tube 58 of the distal end piece 38. It will be appreciated, however, that the contacts could be reversed, as could the engagement of the vacuum hose 10 and the handle.

Figure 8:
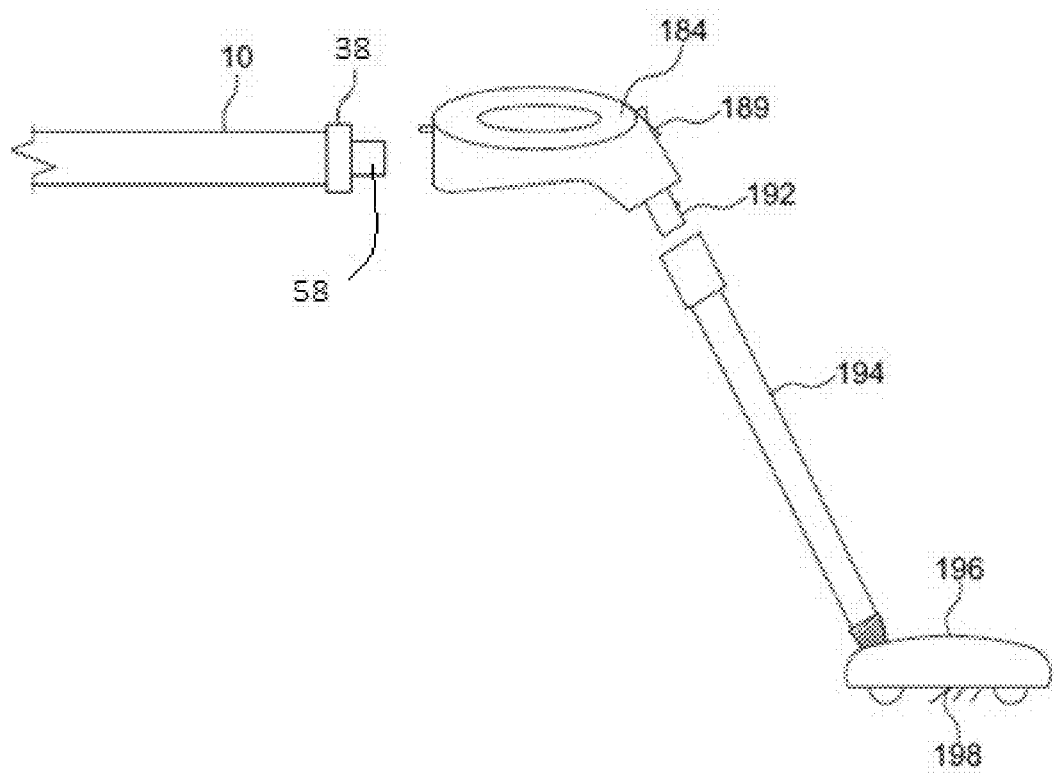
FIG. 8 shows an exploded view of the distal end of the vacuum tube, the handle, a wand and a vacuum head.

FIG. 8 shows a side, exploded view of the handle 184, the vacuum hose 10, and a vacuum wand 194 which engages the distal end tube 192 of the handle. The wand 194 provides pneumatic connection from the handle 10 to a vacuum head 196, which may include powered brushes 198 and the like. A wand 194 may have an internal power wire, or a separate power wire may be used for conducting electricity from the handle to the vacuum head 196 to run brushes, lights, etc. A switch 189 on the handle 184 may be used to turn off the power to the vacuum head 186, to turn off the vacuum pump 120 (FIG. 5), or both.

Figure 9:
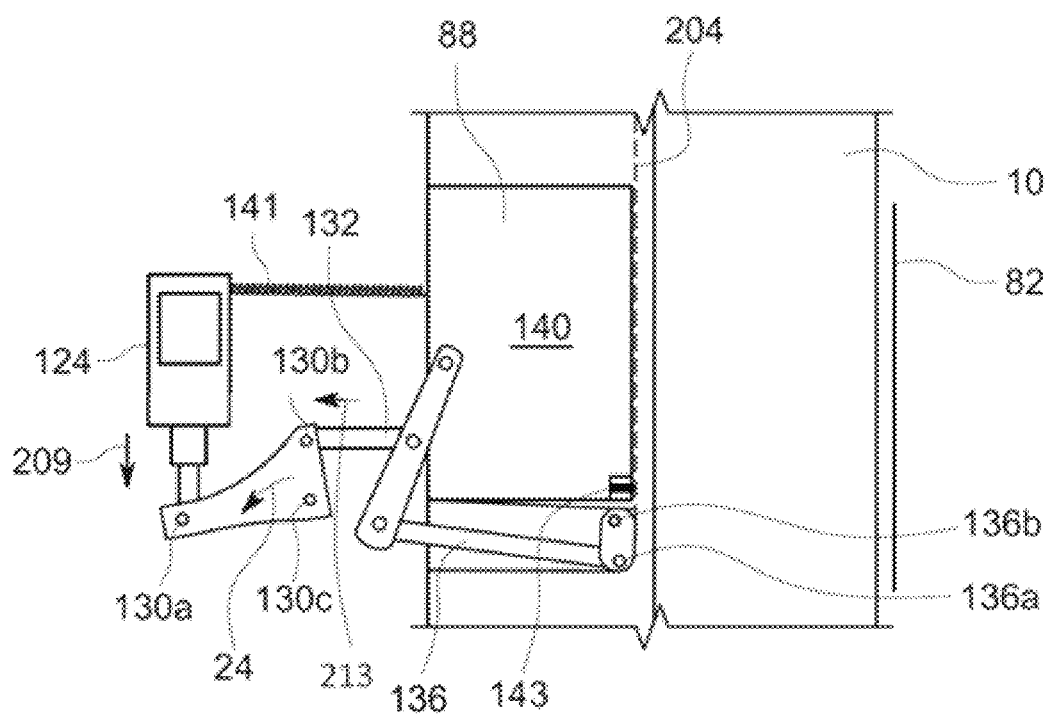
FIGS. 9-11 show close-up views of the engagement module and plunger in a first position, a second position and a third position.
Figure 10:
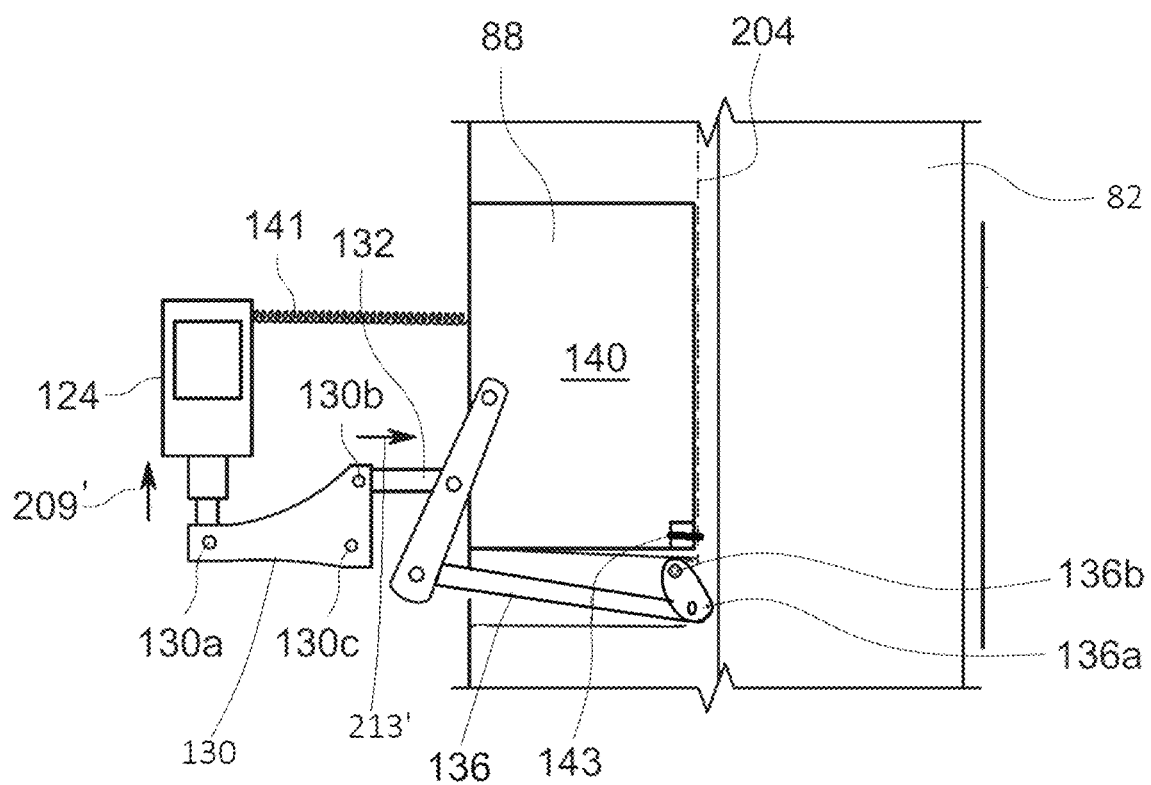
Figure 11:
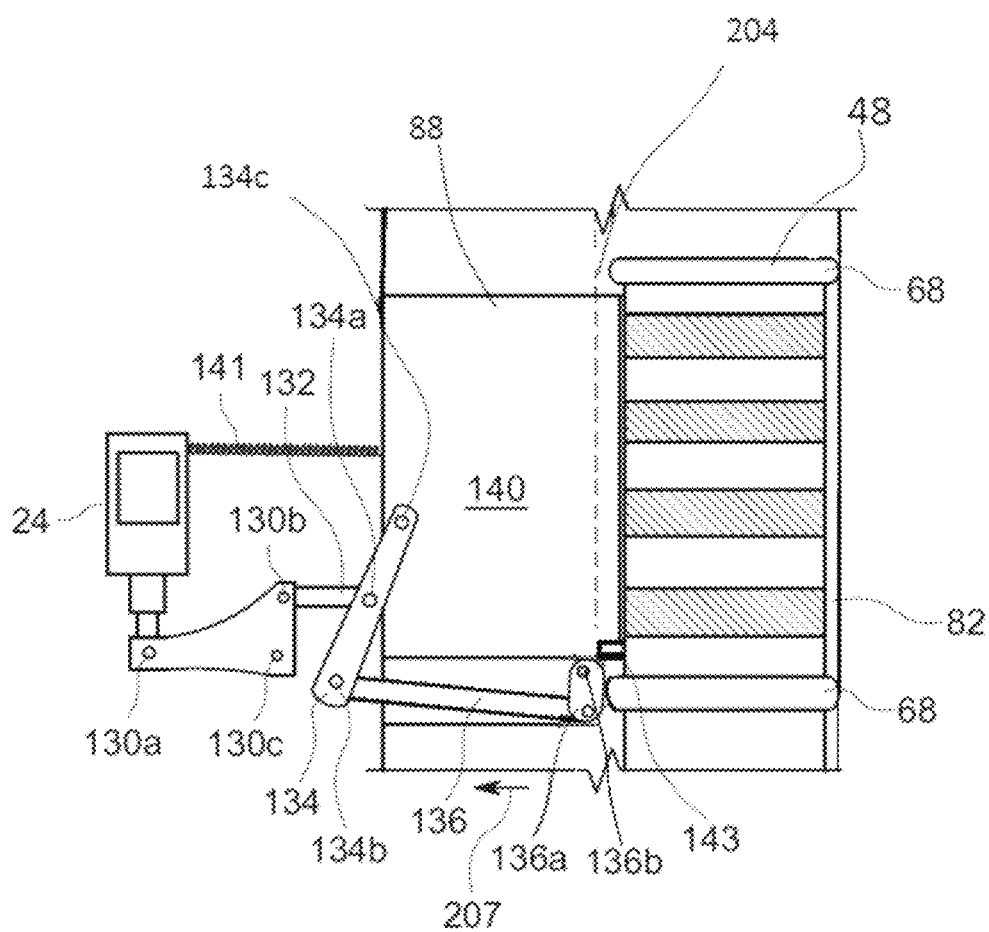
Figure 12:
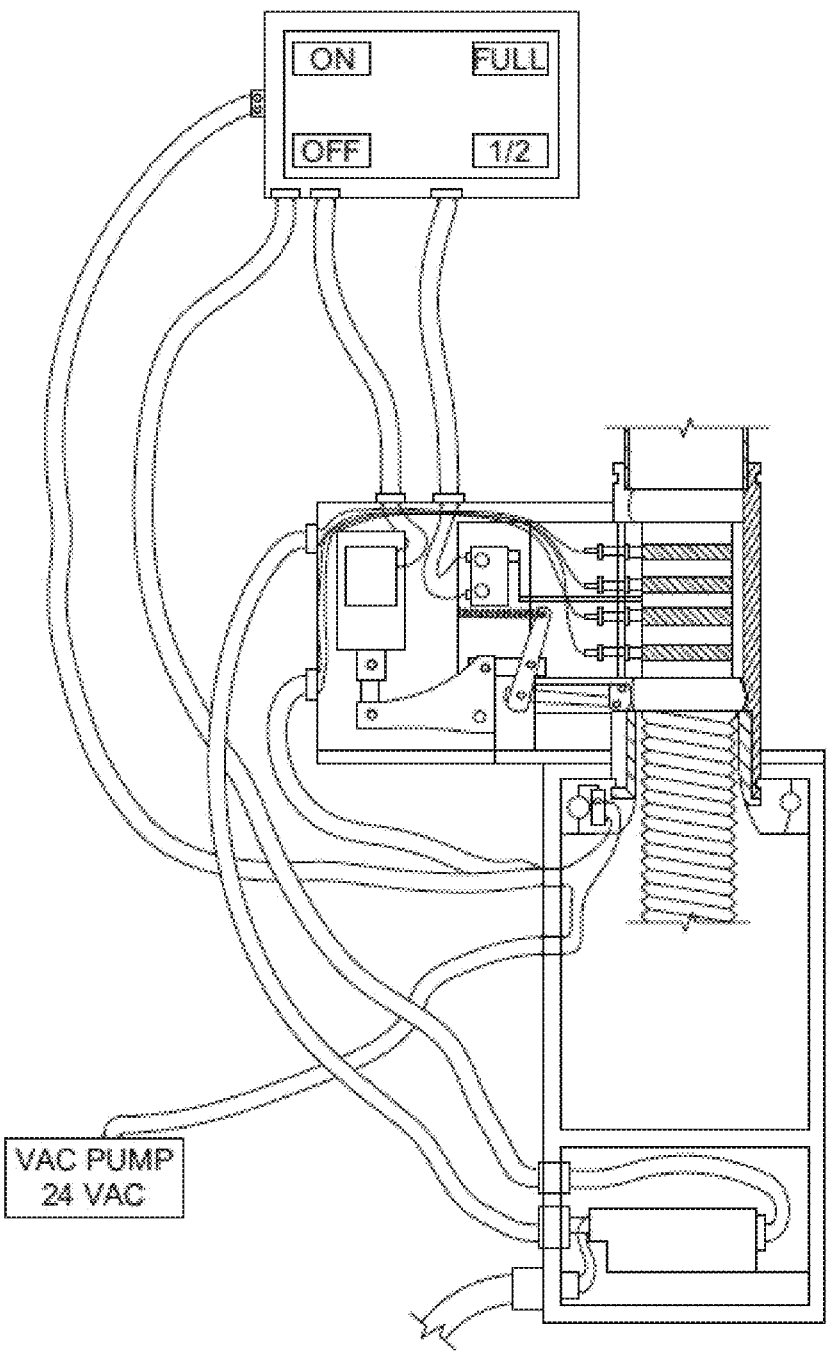
FIG. 12 is an enlarged view of FIG. 5 without numbering to more clearly show the components.

FIGS. 9-11 show close-up views of the hose engagement module 88 and plunger in a first position, a second position and a third position, respectively. In the first position shown in FIG. 9, the actuator 124, such as a solenoid, has been actuated as shown by arrow 209, or is in an extended position depending on the type of solenoid or other actuator used. This rotates or maintains the first linkage 130 to be rotated counter clockwise as indicated by arrow 24, and moves the second linkage 132 to the left as shown by arrow 213. Thus, the plunger 136 is positioned so that the plunger head 136a is disposed adjacent to, but not extending into the receiving chamber 82.

The bracing block or engagement member 140 is held in the retracted position by biasing element 141. In other words, the right or forward end of the engagement member 140 is about even with or outward from where the cylinder wall would be if an opening were not made for the engagement member or bracing block. This is represented by the dashed line 204. In such a position, the bearings of the proximal hose end could pass by the plunger head 136a if, for example, no stop were present.

In FIG. 10, the actuator 124 has been actuated to move in the direction shown by arrow 209'. This causes the first linkage 130 to rotate clockwise, thereby moving the second linkage 132 to the right as shown by arrow 132. This moves the plunger 136 to the right so that the plunger head 136a pivots and extends into the chamber 82 and beyond the line 204 representing where the cylinder wall would be. In such a position the actuator mechanism is primed to receive one of the bearings from the proximal end of the hose.

Turning now to FIG. 11, the lower bearing 68 of the proximal end piece 48 of the hose has been moved into engagement with the plunger head 136a, causing the plunger head to rotate rearwardly (i.e. away from the receiving chamber) about pivot point 136b. The rotation of the plunger head 136a moves the plunger 136 rearwardly as indicated by arrow 207. The plunger 136 causes linkage 134 to rotate about its pivot point 134a, so that the lower end 134b moves rearwardly, while the upper end 134c moves forward, overcoming the biasing member 141 and pushing the engagement member 140 into the receiving chamber 82. (It will be appreciated that a shorter length of linkage 134 below the pivot point 134a causes a greater movement in the upper end 134c). The advanced engagement member 140 and pin 143 hold the proximal end piece 48 in the receiving chamber 82 while the vacuum is in use.

Once finished, the user indicates that they are done on the control panel 100. This causes the control panel 100 to energize the vacuum pump to retract the hose and to energize the actuator 124 to move it back into the position shown in FIG. 9. The extension of the actuator 124 pivots the first linkage 130 as shown in FIG. 9, thereby retracting the engagement member 140 and pin 143, and keeping the plunger head 136a in its original position. This releases the proximal end piece 48 to the hose 10 to be withdrawn into the vacuum system tubing so the hose 10 is retracted through the port 70.

If the full hose length is desired, the control system 100 (FIG. 5) will leave or move the second hose engagement terminal 80' in first position shown in FIG. 9 so that the plunger head 136a does not engage the bearings. If only half of the length is desired, the control system 100 (FIG. 5) will move or maintain the actuator 124 of engagement terminal 80' to move the first linkage 130, and thus the plunger head 136a into the second position shown in FIG. 10 so that the distal bearing 68 will engage the plunger head of the plunger and can thereby activate the engagement member 140 to move into the receiving chamber 82 as shown in FIG. 11. By simply ending the session at the display panel 174, thereby activating the actuator 124 into the position shown in FIG. 9, the engagement member 140 can be withdrawn, thereby freeing the end piece 48 and allowing hose 10 to be retracted into the port 70.

Figure 13:
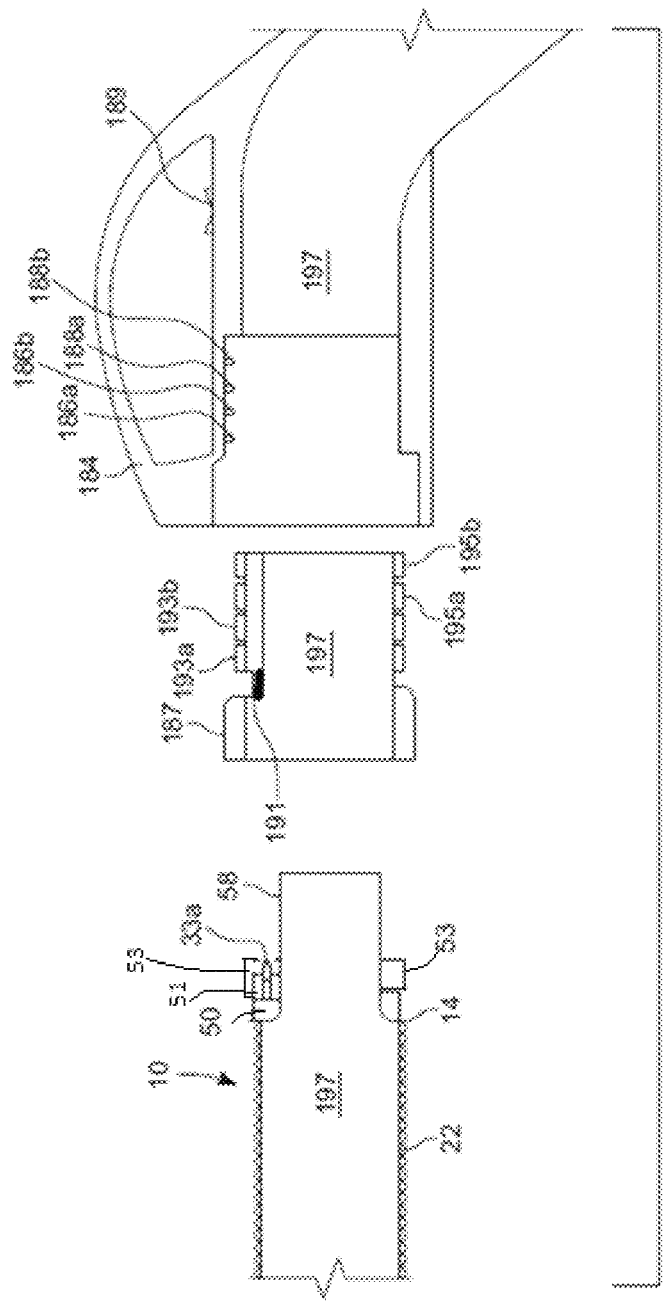
FIG. 13 shows a cross-sectional, exploded view of a distal end of a hose, a handle and a connection adapter.
Figure 14:
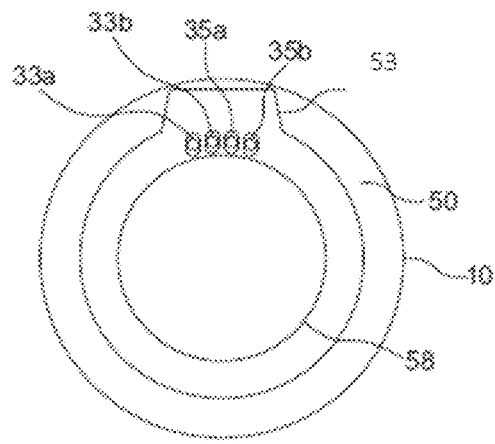
FIG. 14 is an end view of the hose of FIG. 13.
Figure 15:
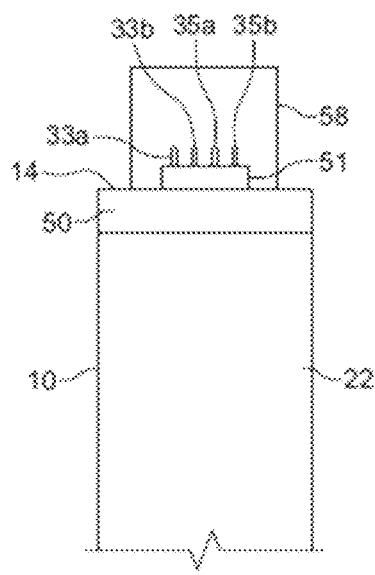
FIG. 15 is a top view of the hose of FIG. 13.

Turning now to FIG. 13, there is shown a cross-sectional, exploded view of a distal end portion 14 of a hose, generally indicated at 10, a fragmented handle 184 and a connection adapter 187. The proximal end portion (not shown) of the hose 10, may be similar to that that shown in FIG. 2, or otherwise be configured to engage with contacts in the engagement module. The distal end portion 14 of the hose 10 may include a plurality of electrical contacts 33a, 33b, and 35a, 35b (as shown in FIGS. 14 and 15) for transmitting electricity and/or electrical signals along the hose 10 to and from the handle 184. For example, a switch 189 on the handle 184 can be used to send a signal back through the hose 10 to either turn on or turn off a vacuum which forms part of the central vacuum system. Likewise, the switch 189 can be used to turn on or off power to a wand (not shown) which may be connected to the handle when cleaning carpets or other flooring material, The electrical contacts 33a, 33b, 35a, 35b may be spring loaded contacts, sometimes called pogo pins, and extend from an extension 51 on a cover 50 configured to hold a hose body 22 to a tube configured to engage the handle 184. A shield or cover 53 may be used to protect a user from contacting the pins without preventing contact between the pins 33a, 33b, 35a, 35b associated pins in the handle or adaptor. A shield or cover 53 may be sized may have channels for receiving the pins 33a, 33b, 35a, 35b so they are recessed and not exposed to the user. The cover 53 may also be shaped to nest in an opening or channel in a handle 184 or a handle adaptor 187. A handle adaptor 187 may include a plurality of electrical contacts 191 (only one of which is visible in FIG. 13) which can be configured to engage the electrical contacts 33a, 33b, 35a, 35b. To facilitate attachment and detachment from the hose, the electrical contacts 33a, 33b, 35a, 35b and 191 etc., may meet end to end, with the cap 53 nesting in the adaptor 187. The contacts 191, may be disposed in communication with annular electrical contacts 193a, 193b, 195a and 195b which may be in sliding communication with electrical contacts 186a, 186b, 188a, 188b located within the handle 184. This enables the distal end 14 of the hose 10 to rotate with respect to the handle 184, thereby lessening the likelihood of the hose body 22 getting tangled.

When the vacuum system in turned on, airflow passes through the channel 197 passing through the handle 184, the adaptor 187 and the hose 10 when the three are connected to one another.

FIG. 14 shows an end view of the distal end portion 14 of the hose 10. The cover 50 and the cover 53 are visible, along with the contacts 33a, 33b, 35a, 35b and the tube 58. FIG. 15, in contrast, shows a top view of the distal end portion 14 of the hose 10, including part of the hose body 22, the cover 50, the tube 58, the extension 51 and the contacts 33a, 33b, 35a, 35b. The ability to easily remove the handle 184 from the distal end 14 of the hose 10 is desirable because of the limited space which is available to hold the distal end of the hose within the wall without making the central vacuum system overly noticeable. The handle 184 and any wand 194 (FIG. 8) can be detached and kept in a closet when not in use. When needed, they can be taken out and attached to the distal end portion 14 of the hose 10.

Figure 16:
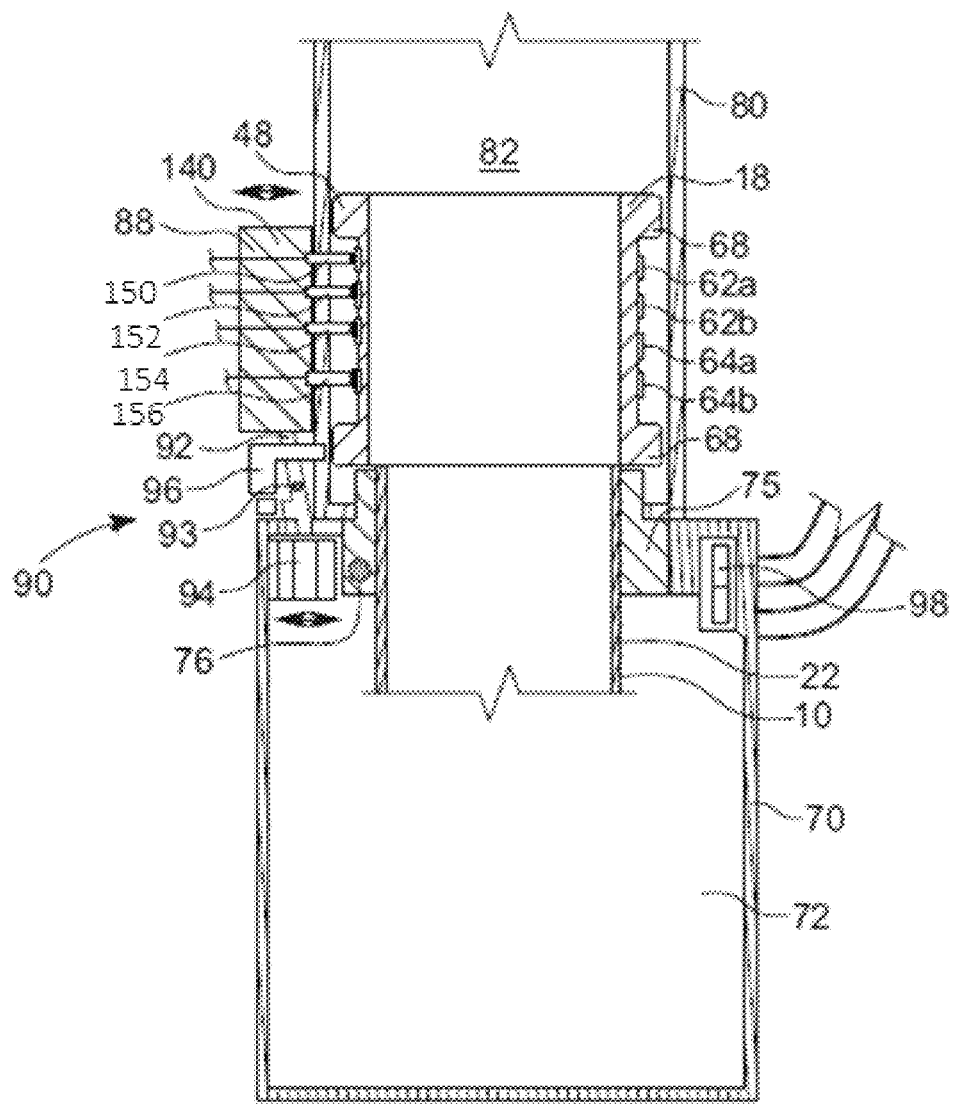
FIG. 16 shows a cross-sectional view of an alternate port through which a retractable vacuum hose is withdrawn and a vacuum hose engagement terminal which engages the proximal end of the retractable hose to thereby provide power through the retractable vacuum hose.

FIG. 16 shows a cross-sectional view of an alternate a port 70 through which a retractable vacuum hose 10 is withdrawn and a vacuum hose engagement terminal 80 which engages the proximal end portion 18 of the retractable hose to thereby provide power through the retractable vacuum hose. The retractable hose 10 has been fragmented to make other parts easier to see. The port 70 includes a void 72 through which the hose body 22 can pass and which is sized to hold at least a portion of the distal end portion 14 of the hose when not in use. The port 70 may be a generally rectangular box or can come in other shapes.

The port 70 may include an opening at or near the top into which a stop 75 is disposed. The purpose of the stop 75 is to prevent the proximal end portion 18 of the hose 10 from being drawn out of the central vacuum system. The stop 75, however, may be held in place by a clip, fastener, such as a screw 76 or some other removable means to that the proximal end 18 of the hose 10 may be removed from the system when necessary, such as when the hose needs to be replaced. The stop 75 may be a single piece or multiple pieces and it may extend out of the port and into the vacuum hose engagement terminal 80 to keep the proximal end portion 18 of the hose from extending down into the port. (The stop 75 also prevents the distal end portion 14 of hose 10 from being drawn into the chamber 82.)

Figure 17:
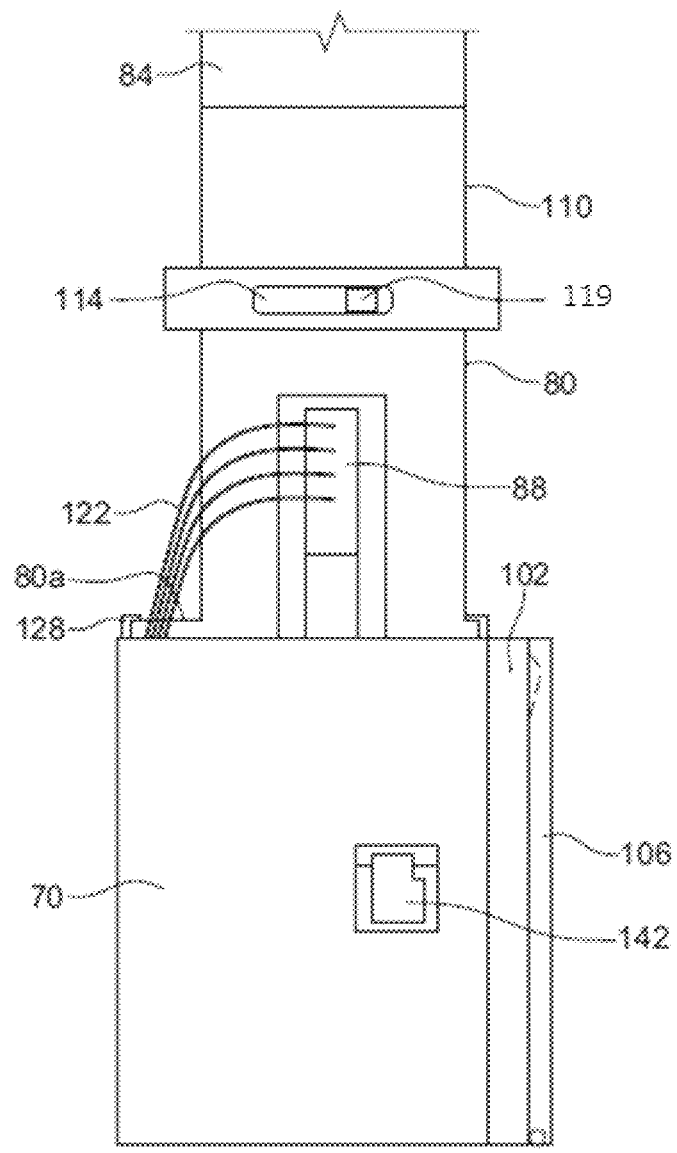
FIG. 17 shows a side view of the port shown in FIG. 14.

As with the hose as shown in FIG. 5, the proximal end portion 18 of the hose 10 may include the end piece 48 having a plurality of electrical contacts in the form of annular contact rings 62a, 62b, 64a, 64b, and bearings 68 which help the proximal end slide in the tubing of a central vacuum systems. The outer diameter of the bearings 68 are preferably just smaller than the inner diameter of the tubing and the hose engagement terminal 80. If desired, one or both of the bearings could be formed so as to form an airtight seal with the hose engagement terminal 80 and/or the tubing 84 (FIG. 17). This could be done, for example, by placing a flexible seal made of Teflon.

Disposed on a left side of the hose engagement terminal 80 in FIG. 16 is an engagement module 88, which can be selectively moved into and out of contact with the proximal end 18 of the hose 10 by an actuation module 90. The engagement module 88 may include an engagement body or engagement member 140 which holds a plurality of contacts 150, 152, 154, and 156. The engagement member 140 may be moved forward or backward by the actuation module 90 between a first position wherein a plurality of electrical contacts 150, 152, 154, and 156 are withdrawn and a second position (shown in FIG. 16) wherein each of the contacts engage a respective one of the annular contact rings 62a, 62b, 64a, 64b of the proximal end portion 18. The contacts 150, 152, 154, and 156 may be spring contacts or spring mounted to adjust for any variation in the location of the proximal end 18 of hose 10.

The engagement module 88 is moved between the first position and the second position by an actuation module 90, as shown in FIG. 16, the actuation module 90 may include a linkage, such as an arm or lever 92 which pivots about a pin 93. A first end (not shown in FIG. 16) engages the engagement module 88 so that movement of a switch 94 engages the lever and can move the engagement member between the first position and the second position. A retaining pin 96 engages the lever 92 to selectively prevent movement of the lever to keep the engagement member 88 in the first position when the proximal end portion 18 is not disposed in the hose engagement terminal 80. When the lower bearing 68 on the proximal end 18 engages the retaining pin and moves it rearwardly, the lever 92 is released so that the engagement module 88 can move forward into the second position so that the contacts 150, 152, 154, and 156 move into engagement with the annular contacts 62a, 62b, 64a and 64b.

When the user is finished with the vacuum, the user flips the switch 94 to move the lever 92 and cause the engagement module to move back into the first position. Disconnecting the engagement module 88 from the first end 18 may disconnect electricity to the central vacuum canister (not shown), thereby terminating vacuum flow. To draw the hose back into the wall, a power switch 98 can be flipped to power the vacuum canister and the distal end of the hose 10 can be covered so that the suction draws the hose 10 back into the central vacuum system. The port 70 has a cover 102, shown in FIG. 22, which includes a door 106 which turns off the switch when it closes (which is not possible until the distal end portion 14 of the hose is back inside the port. The door may also seal the port so that there is little or no leakage of suction when another part of the central vacuum system is being used.

FIG. 17 shows a side view of the port 70 and tube engagement terminal 80 shown in FIG. 16. A tubing coupler 110 is attached to the hose engagement terminal 80 by a slot 114 which engages a nub 119 on the tube engagement terminal 80. The tubing coupler 110 connects the central vacuum system tubing 84 to the tube engagement terminal 80

The engagement module 88 is also visible. A plurality of wires 122 extend from the engagement member 140 to provide high and low voltage power to the contacts 150, 152, 154, 156 extending from the engagement member. The plurality of wires 122 may be connected to a power supply, such as that shown in FIG. 5 at 78. The wires can pass through the port 70 if desired.

The hose engagement terminal 80 can be attached to the port 70 in a variety of manners. For example, the tube engagement terminal 80 may include a flange 80a, and bracket 128 on the port 70 which receives the flange. Threaded fasteners and other connectors could also be used. It will be appreciated that it is desirable for the connections to be air tight so that there is not leakage of air between the parts, which would reduce suction in the central vacuum system.

FIG. 17 also shows mounting wings 142 disposed in the body of the port 70. While the port 70 can be attached to a stud by fasteners, such as screws, the mounting wings can be used to secure the port to a piece of wall board away from studs. It will be appreciated that multiple other anchoring devices could also be used.

Figure 18:
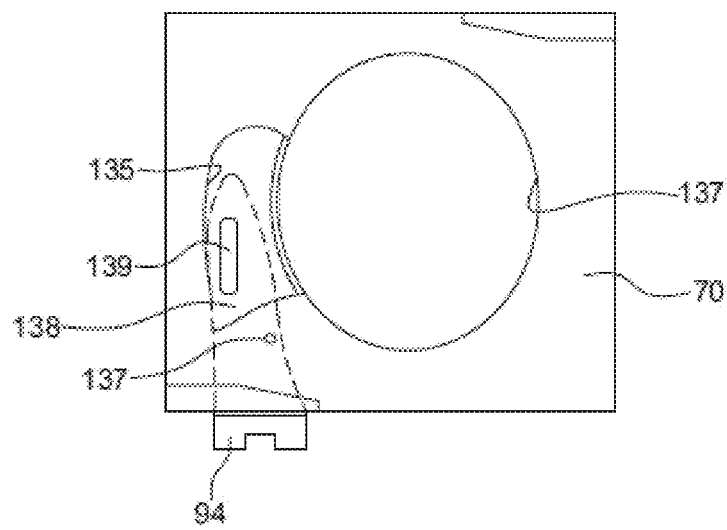
FIG. 18 shows a top view of the port shown in FIG. 14 with the hose engagement terminal removed.
Figure 19:
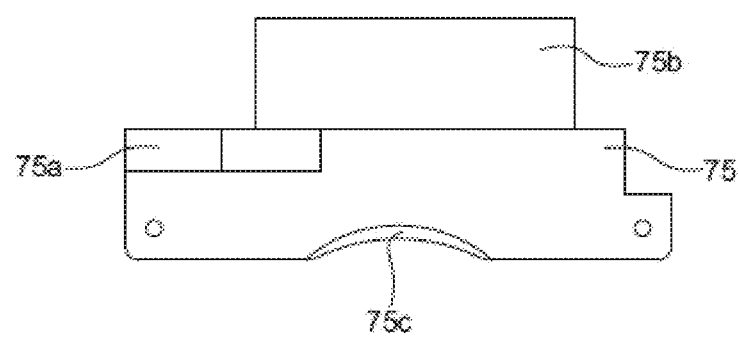
FIG. 19 shows a front view of a stop which may be disposed in the port and extending into the hose engagement terminal.

FIG. 18 shows a top view of the port 70 shown in FIG. 16 with the hose engagement terminal removed. The switch 94 is attached to the top of the port 70 by a pin 137. The port 70 may include a primary opening through which the stop 75 and an extended hose 10 (FIG. 16) extends, as well as a secondary opening 135. The switch 94 may include an arm 138 having a slot 139 which is visible through the secondary opening 135. The arm 138 or slot 139 may engage the lever 92 (FIGS. 16 and 20-21) of the actuation module 90 to move the engagement module 88 (FIG. 16) between the first position and the second position. FIG. 19 shows a front view of a stop 75 which may be disposed in the port 70 and extending into the hose engagement terminal. The stop 75 may include a notch 75a which has been removed to accommodate the arm 138 of the switch 94 shown in FIG. 18. The stop 75 may include a sealing mechanism so that the secondary opening is effectively pneumatically isolated from the remainder of the port. Alternatively, the secondary opening could be sealed by the hose engagement terminal.

An upper portion 75b of the stop 75 may be long enough to extend to or into the hose engagement terminal 80 (FIG. 16) to form an affirmative stop for the proximal end portion 18 of the hose 10 as shown in 16. As long as the stop 75 is in place, the proximal end portion 18 may be prevented from moving out the bottom of the hose engagement terminal 80 (FIG. 16). The stop 75 may also have a rounded portion 75c which is saddle shaped or concave in one orientation and convex in an orientation perpendicular thereto to provide a channel for guiding the hose when it is being pulled out of or drawn back into the wall.

Figure 20:
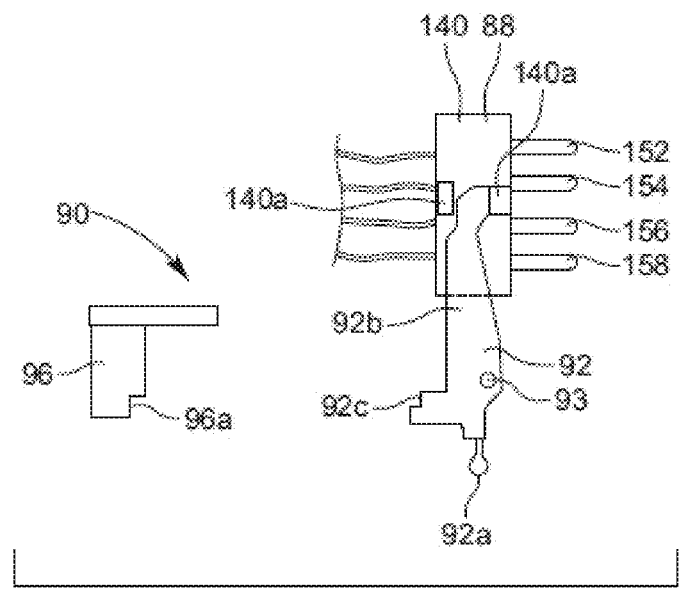
FIG. 20 shows a side view of an engagement module and actuation system.

FIG. 20 shows an exploded view of an engagement module 88 and actuation module 90. The engagement module 88 may include the electrical contacts 150, 152, 154, and 156, the engagement member 140 which holds the contacts, and one or more engagement projections 140a. The lever 92 of the actuation member 90 may engage the projections 140a to move the engagement member 140 between the first and second positions as the lever pivots about pin 93. The lever 92 may include a lever extension projection or pin 92a which extends into the slot 139 in the arm 138 (FIG. 18).

The lever 92 may also include a channel 92b which may receive the retaining pin 96. The lever 92 may include an arm with a step 92c, and the retaining pin 96 may include a step 96a which engages the step on the lever so that the lever cannot move when the retaining pin is in a first, forward position. However, movement of the proximal end portion 18 of the hose 10 into the receiving chamber 82 (FIG. 16) may cause the lower bearing 68 to engage the end of the retaining pin 96 pushing it rearwardly so that the step 96a disengages the step 92c, and allows the lever 92 to move. The retaining pin 96 may be manually reset upon removal of the lower bearing, or may be in engagement with a biasing element to return it to the first position.

Figure 21:
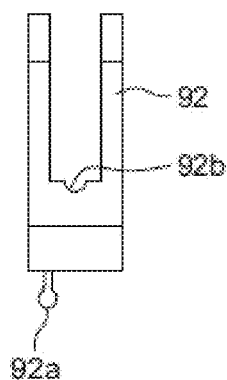
FIG. 21 shows a front view of the linkage disposed in the actuation system.

FIG. 21 shows a side view of the linkage formed by the lever 92. The lever may include two arm portions to engage either side of the engagement module 88 (FIG. 20) to give additional support. Also shown in FIG. 21 is the projection 92a and the channel 92b which receives the retaining pin 96.

Figure 22:
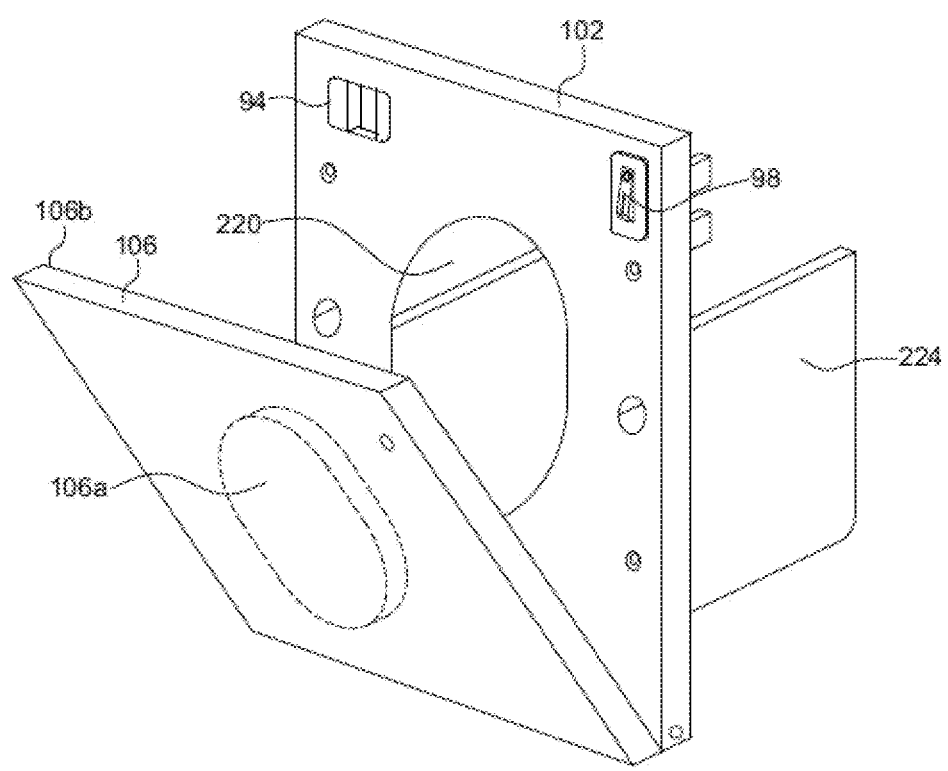
FIG. 22 shows a perspective view of a cover for the port.

FIG. 22 shows a perspective view of a cover 102 for the port (now shown). The cover 102 includes the door 106 which closes to seal the opening 220 through which the hose (not shown) extends when in use. The cover 102 may have an opening to provide access to one end of the switch 94 used to move the actuator module. It may also hold the switch 98 which is used to turn on the central vacuum canister (not shown) when the engagement module can be moved out of connection with the proximal hose end. Preferably, the door 106 is configured to engage and move the vacuum activation switch 98 into the off position when the door closes. Thus, closing the door 106 will automatically turn off the vacuum. The door 106 may also include a projection 106a sized and shaped to fill the opening 220 when the door closes, to thereby provide an additional seal against leakage through the door. The door 106 may also have a grommet, rubber coating or other seal disposed about its edge to further seal the interior of the port from the environment. As shown in FIG. 22, the cover 102 may also include a frame 224 which fits or nests inside of the port 72 (not shown) to further secure the cover. Frame 224 may support stop 75 as well as create an isolated cavity for electrical wiring in box 70.

While the hose 10 and the engagement module 80 are discussed as having both low voltage and high voltage contacts, it will be appreciated that in some embodiments a hose may be provided which is configure to only provide low voltage power which can be used to turn on and off the central vacuum system. Such may be desirable for places like Europe and many modern apartments which use wood, vinyl or tile flooring throughout the home. The user can still activate or deactivate the central vacuum system at the distal end of the retractable vacuum hose.

Likewise, it will be appreciated that a non-powered hose could also be used in the system. Thus, for example, a new home owner could purchase the system with a retractable hose which lacks the power contacts to save money, and then upgrade to a powered hose at a later time.

Thus, there is disclosed a retractable vacuum hose system. It will be appreciated that numerous modifications may be made without departing from the scope and spirit of this disclosure. It will be appreciated that various parts of one drawing may be used in connection with the system of another drawing. For example, the cover shown in FIG. 22 may be used with the system shown in FIG. 5. The appended claims are intended to cover such modifications.

What is claimed is:

1. A retractable hose system for central vacuum cleaning systems, the retractable hose system comprising:
   a retractable hose having a proximal end portion having a plurality of contacts and a distal end portion with electrical wiring extending between the proximal end portion and the distal end potion; and
   a hose engagement terminal having an engagement module for selectively moving some portions of the hose engagement terminal into engagement with the proximal end portion and thereby make electrical contact with the plurality of contacts on the proximal end portion to thereby provide power to the retractable hose;
   wherein the retractable hose is slidable within the hose engagement terminal unless engaged by the engagement module.

2. The retractable hose system for central vacuum cleaning systems of claim 1, wherein the distal end portion includes a plurality of contacts, wherein the contacts on the proximal end portion are configured to engage and receive power from an engagement member of the engagement module and wherein the distal end portion is configured to releasably engage a handle so as to power the handle via the contacts on the distal end portion.

3. The retractable hose system for central vacuum cleaning systems of claim 1, wherein the hose engagement terminal has a receiving chamber and a stop disposed adjacent the receiving chamber for limiting advancement of the proximal end portion out of the receiving chamber.

4. The retractable hose system for central vacuum cleaning systems of claim 1, wherein the hose engagement terminal includes an actuator and a plunger disposed in communication with the actuator, and wherein the plunger has a first, retracted position and a second, extended position.

5. The retractable hose system for central vacuum cleaning systems of claim 1, wherein the proximal end portion includes at least one bearing configured for sliding within a central vacuum system and a plurality of annular electrical contacts disposed adjacent the at least one bearing.

6. The retractable hose system for central vacuum cleaning systems of claim 5, wherein the at least one bearing comprises a first bearing disposed adjacent a proximal end of the proximal end portion and a second bearing disposed adjacent a distal end of the proximal end portion.

7. The retractable hose system for central vacuum cleaning systems of claim 6, wherein the proximal end portion has a portion disposed between the first bearing and the second bearing, and wherein the first bearing and the second bearing each have a diameter which is greater than the portion of the proximal end portion disposed between the first bearing and the second bearing.

8. The retractable hose system for central vacuum cleaning systems of claim 6, wherein the first bearing and the second bearing are rounded along a longitudinal axis of the proximal end portion.

9. The retractable hose system for central vacuum cleaning systems of claim 6, wherein the first bearing and the second bearing are rounded along a longitudinal axis of the proximal end portion.

10. The retractable hose system for central vacuum cleaning systems of claim 1, wherein the engagement module includes an engagement member having at least one electrical contact, the engagement member being movable between a first position wherein the at least one electrical contact does not engage the proximal end of the retractable hose and a second position wherein the at least one electrical contact engages the proximal end portion of the retractable hose.

11. The retractable hose system for central vacuum cleaning systems of claim 10, further comprising a second hose engagement terminal for engaging and securing the proximal end portion of a retractable hose.

12. The retractable hose system for central vacuum cleaning systems of claim 11, further comprising an actuation module for moving the engagement member between first position and the second position, and wherein the actuation module will not move the engagement member into the second position unless the proximal end portion of the retractable hose is disposed in the first hose engagement terminal.

13. The retractable hose system for central vacuum cleaning systems of claim 1, wherein the hose engagement terminal includes an engagement module having a sensor for determining when the engagement module has engaged the proximal end portion.

14. The retractable hose system for central vacuum cleaning systems of claim 13, further comprising a retaining pin extending into the hose engagement terminal and wherein one of the bearings moves the retaining pin when the proximal end portion is disposed in the hose engagement terminal.

15. A retractable hose system for central vacuum cleaning systems, the retractable hose system comprising:
   a retractable hose having a proximal end portion having a plurality of contacts and a distal end portion with electrical wiring extending between the proximal end portion and the distal end potion; and
   a hose engagement terminal, wherein the retractable hose is slidable within the hose engagement terminal until the proximal end portion of the retractable hose is disposed i n the hose engagement terminal, wherein the hose engagement terminal has an engagement module for selectively engaging the proximal end portion and thereby make electrical contact with the plurality of contacts on the proximal end portion to thereby provide power to the retractable hose while the proximal end portion of the retractable hose is disposed in the hose engagement terminal.

16. The retractable hose system for central vacuum cleaning systems of claim 15, wherein the distal end portion includes a plurality of contacts, wherein the contacts on the proximal end portion are configured to engage and receive power from an engagement member of the engagement module and wherein the distal end portion is configured to releasably engage a handle so as to power the handle via the contacts on the distal end portion.

17. The retractable hose system for central vacuum cleaning systems of claim 15, wherein the proximal end portion includes at least one bearing configured for sliding within a central vacuum system and a plurality of annular electrical contacts disposed adjacent the at least one bearing.

18. The retractable hose system for central vacuum cleaning systems of claim 15, wherein the engagement module includes an engagement member having at least one electrical contact, the engagement member being movable between a first position wherein the at least one electrical contact does not engage the proximal end of the retractable hose and a second position wherein the at least one electrical contact engages the proximal end portion of the retractable hose.

19. The retractable hose system for central vacuum cleaning systems of claim 15, the at least one bearing comprises a first bearing disposed adjacent a proximal end of the proximal end portion and a second bearing disposed adjacent a distal end of the proximal end portion.

20. The retractable hose system for central vacuum cleaning systems of claim 19, wherein the proximal end portion has a portion disposed between the first bearing and the second bearing, and wherein the first bearing and the second bearing each have a diameter which is greater than the portion of the proximal end portion disposed between the first bearing and the second bearing.

21. A retractable hose system for central vacuum cleaning systems, the retractable hose system comprising:
   a retractable hose having a proximal end portion having a plurality of contacts and a distal end portion having a plurality of contacts, the plurality of contact of the proximal end portion being connected to the plurality of contacts of the distal end portion with electrical wiring extending therebetween; and
   a hose engagement terminal having an engagement module for selectively moving some portions of the hose engagement terminal into engagement with the proximal end portion and thereby make electrical contact with the plurality of contacts on the proximal end portion to thereby provide power to the retractable hose;
   wherein the retractable hose is slidable within the hose engagement terminal unless engaged by the engagement module.

\* \* \* \* \*